United States Patent [19]

Morris

[11] 4,435,439

[45] Mar. 6, 1984

[54] FROZEN DESSERT

[76] Inventor: John D. Morris, 203 Buckingham Rd., Pittsburgh, Pa. 15215

[21] Appl. No.: 395,999

[22] Filed: Jul. 7, 1982

[51] Int. Cl.³ .............................................. A23G 9/02
[52] U.S. Cl. .................................... 426/565; 426/599
[58] Field of Search ............... 426/565, 566, 567, 599, 426/101

[56] References Cited

U.S. PATENT DOCUMENTS

| | | | |
|---|---|---|---|
| 2,131,650 | 9/1938 | Webb | 426/565 |
| 2,550,656 | 4/1951 | Knechtges | 426/565 |
| 2,651,575 | 9/1953 | Talburt et al. | 426/565 |
| 2,858,221 | 10/1958 | Laurie | 426/565 |
| 3,922,371 | 11/1975 | Julien | 426/565 |
| 4,021,583 | 5/1977 | Arden | 426/565 |
| 4,293,580 | 10/1981 | Rubenstein | 426/565 |
| 4,368,211 | 1/1983 | Blake et al. | 426/565 |

*Primary Examiner*—Jeanette M. Hunter
*Attorney, Agent, or Firm*—LeBlanc, Nolan, Shur & Nies

[57] ABSTRACT

A frozen fat-free dessert obtained by combining a pasteurized protein-containing mixture with a sufficient amount of concentrated fruit juice, such that the final product contains an equivalent level of fruit juice concentrate equal to at least 100% fruit juice and with a level of protein equivalent to that contained in a corresponding amount of whole milk. The invention includes: the addition of concentrated fruit juice to the initial mix after pasteurization of the mix, rather than pasteurizing the components together, thus avoiding a cooked juice taste; the blending of the initial mix and fruit juice concentrate in cold condition with the mix viscous so that high levels of fruit juice will blend with high levels of protein, without noticeable protein precipitation which would cause graininess; maintaining the viscosity of the mix at a level which will provide a smooth texture; maintaining a high level of protein in the final product; providing a final product having the ability to contain air at 50% of volume; and the ambience of the eating qualities of the final product.

17 Claims, No Drawings

FROZEN DESSERT

BACKGROUND AND SUMMARY OF THE INVENTION

The present invention relates to a frozen dessert composition and, more particularly, to an essentially fat-free dessert obtained by combining a pasteurized protein-containing mixture with a sufficient amount of concentrated fruit juice, such that the final product contains an equivalent level of fruit juice concentrate equal to at least 100% fruit juice and with a level of protein equivalent to that contained in a corresponding amount of whole milk.

Previous frozen dessert compositions containing fruit juice have usually been classified in one of two categories known as ices and sherbets. Those compositions known as ices generally have the following formula range: fat—0%; protein—0%; and sugar—up to 30%. Ices may contain one or more fruit juices, along with flavoring, coloring, stabilizers and citric acid. The percent amounts of the various components as stated throughout this specification are in terms of percent by weight, unless otherwise noted.

Those compositions known as sherbets generally have the following formula range: milk solids—a maximum of 5%; fat—1 to 3%; protein—1.1 to 1.8%; and sugar—25 to 30%. When fruit juice is employed in sherbet compositions, the fruit juice component generally constitutes no more than 25% of the sherbet mixture. Other ingredients often used include flavoring, coloring, stabilizers, emulsifiers and citric acid. The overrun in such sherbet compositions is generally in the 30% to 50% range. Overrun for the purposes of this specification is defined as the volume of gas contained in the finished frozen product as compared to the volume of solids, expressed as a percentage. Thus, a frozen dessert comprising 50 volume percent gas and 50 volume percent solids has an overrun of 100 percent.

Frozen desserts containing fruit components are described in the following patents: U.S. Pat. Nos. 2,651,575 to Talburt et al; 4,293,580 to Rubenstein; and 4,297,379 to Topalian et al. The Talbert et al patent is concerned with impregnating pieces of fruit with concentrated juice followed by blending the impregnated fruit pieces with a liquid of the ice cream or sherbet type and freezing the mixture. The Rubenstein patent relates to the preparation of a soft frozen whipped fruit or vegetable juice concentrate which is prepared by simultaneously whipping and freezing a concentrate in the presence of whipping protein materials and stabilizers. The Topalian et al patent is concerned with frozen gelatin compositions in which fruit juice may be employed to dissolve the gelatin mix.

Various ice cream mixtures having low fat content are described in the following patents: U.S. Pat. Nos. 3,345,185 to Pisani et al; 3,510,316 to Decker; 3,800,036 to Gabby et al; and 4,282,262 to Blake.

By the present invention there is provided a frozen dessert composition which contains: (a) an equivalent level of fruit juice concentrate equal to at least 100% fruit juice; and (b) an equivalent level of protein, by weight, as in an equivalent amount of whole milk. The present dessert is essentially fat-free, having less than 0.5% fat, and with an overrun capability above 90%. The present invention provides a frozen dessert which is a new, unique product having a smooth texture and a pleasant taste. The ingredients used in the frozen dessert of the present invention are ingredients which would conform with those mentioned in the Federal Standards of Identity for frozen desserts.

The frozen dessert of the present invention is prepared by combining the following components to obtain an initial mix:

| Component | Amount in Weight % |
| --- | --- |
| Non Fat Milk Solids | 10–13.5% |
| Sweetening Agent | 10.5–13% |
| Casein | 0–1.10% |
| Other Solid Components | 1.5–2.25% |
| Water | to 100% |

The initial mix is pasteurized at a minimum temperature of 165° F. for a minimum time period of 30 minutes. Following pasteurization the mix is immediately cooled to 40° F. or below. The mix is subsequently added to concentrated fruit juice, which has been tempered, in a ratio as to the concentration of the particular fruit juice. The mix is blended with the fruit juice concentrate until a uniform mixture is obtained, and the final uniform mixture is then frozen for subsequent use. An important characteristic of the present invention is the ability of the initial mix to accept the fruit juice concentrate and produce a smooth finished product.

Accordingly, it is an object of the present invention to provide a low fat frozen dessert containing high levels of protein and fruit juice solids.

It is another object of the present invention to provide a frozen dessert having essentially no fat content, less than 0.5 weight %, with the equivalent level of protein as in whole milk and with an equivalent level of fruit juice solids as found in a corresponding volume of fruit juice.

It is another object of the invention to provide a frozen dessert containing substantial amounts of fruit juice solids, in which an initial mix containing non-fat milk solids is pasteurized prior to the addition of the fruit juice to avoid a cooked juice taste.

It is a further object of the invention to provide a frozen dessert in which the final composition contains high levels of fruit juice as well as high levels of protein materials, but without noticeable protein precipitation which would result in graininess of the product.

It is a further object of the invention to provide a dessert mix composition having a viscosity which will provide a smooth textured final product.

Another object of the invention is to provide a frozen dessert composition in which air is incorporated in the product in an amount up to 50% of the total volume of the product.

DESCRIPTION OF THE PREFERRED EMBODIMENTS

The foregoing and additional objects and advantages are obtained by the frozen dessert composition of the present invention, obtained by initially preparing a mix containing the following components:

| Initial Mix Composition | |
| --- | --- |
| Component | Amount in Weight % |
| Non Fat Milk Solids | 10–13.5% |
| Sweetening Agent | 10.5–13% |
| Casein | 0–1.10% |
| Other Solid Components | 1.5–2.25% |

| -continued | |
|---|---|
| Initial Mix Composition | |
| Component | Amount in Weight % |
| Water | to 100% |

As previously stated, one of the objects of the invention is to produce a frozen dessert having an equivalent level of protein as that found in an equivalent volume of whole milk. The protein in the mix composition is provided by the addition of non-fat dry milk solids and the casein component, the latter providing a concentrated source of protein.

The sweetening agent may be any of various sugars such as can sugar or other nutritive carbohydrate sweetening agents as described in U.S. Pat. No. 4,282,262 to Blake which is incorporated herein by reference. A particular bulking agent which may be employed with a non nutritive sweetening agent such as saccharin or protein based sweetening agent such as Aspartame is polydextrose, a patented product of Pfizer Corporation. Polydextrose functions as a low calorie bulking agent having only one-fourth the calories of a sweetener such as cane sugar.

The other solid components include stabilizers, emulsifiers, corn syrup solids, various salts and microcrystalline cellulose. The stabilizer component may be any of various stabilizers known in the art, such as carrageenan, guar gum, carob bean gum and sodium carboxymethylcellulose. The stabilizers are used for their water imbibing properties and to provide body and texture to the finished product. An amount of stabilizer is employed sufficient to produce, in combination with the other initial mix components, the desired viscosity range of about 18 to 31 seconds as taken at a mix temperature of 165° F. immediately after pasteurization. Viscosity is measured by a conventional Zahn cup vicosity meter with the B tip. The upper limit of the amount of stabilizer employed is that amount which is about 0.05 weight % of the final finished product.

The emulsifier component may be selected from the mono and diglycerides or other suitable emulsifiers known in the art. The purpose of the emulsifier is to provide a stable air cell structure in the finished product and to control overrun. The emulsifier should be employed in an amount sufficient to produce, in combination with the other components, a final product having an overrun capability in the range of about 90 to 100%. The maximum desirable characteristics of product texture and taste were found to be obtained when the overrun was in this range. The upper limit of the amount of emulsifier employed is that amount which is about 0.2 weight % of the finished product.

Corn syrup solids may be used, if desired, to provide the mouth-feel characteristic derived from the starch effect of the higher saccharides. Various salts may be used to control the pH of the mix and thus the tartness of the product, such salts including calcium oxide, calcium hydroxide, magnesium oxide and magnesium hydroxide. The corn syrup solids and pH controlling salts are not essential components of the composition but may be used as desired. Microcrystalline cellulose is used to provide a non-caloric source of solids. The upper limit of the amount of microcrystalline cellulose employed is that amount which is about 1.5 weight % of the finished product.

The lower limit of the amount of other solid components employed is that amount which will achieve the desired viscosity range of the initial mix as set forth above.

Water is employed in the initial mix in an amount sufficient to provide a total of 100 weight % total mix. Thus, in a case where a minimum amount of each of the other components is employed, such minimum amounts would constitute about 22.7 weight % of the total mix and water would then be used in an amount of about 77.3 weight % to give a total of 100 weight %. Similarly, where the other components are employed in maximum amounts, such maximum amounts would constitute a total of about 29.0 weight % of the total mix and water would be used in an amount of about 71.0 weight %. Thus, the amount of water employed in the initial mix composition will be in the range of from about 71.0 to about 77.3 weight % of the total mix, depending upon the specific amounts of each of the other components present in the mix.

All mixes prepared as stated above are pasteurized at a minimum temperature of 165° F. for a minimum time period of 30 minutes. Viscosity readings are taken immediately after pasteurization with a Zahn cup viscosity meter using the B tip. The viscosity range at a mix temperature of 165° F. should be about 18 to 31 seconds.

Upon completion of pasteurization the initial mix is immediately cooled over a surface cooler to a temperature of 40° F. or below. At this stage, the mix is then in condition to be used immediately or to be stored for a period of as much as several days at such cooled temperatures and used when convenient.

In use, the initial mix composition is added to concentrated fruit juice which has been tempered by warming the concentrate to a temperature of approximately 40° F. In combining the initial mix with the concentrate, the mix is added in a ratio as to the concentration of the particular fruit juice. Generally, the fruit juice concentrate employed in preparing the frozen dessert compositions of the present invention will be concentrated in the range of from about 3:1 to about 7:1 The minimum ratio of concentrated juice used must be enough to bring the aqueous phase of the final blended composition to a whole juice strength or the solids in the initial mix can be treated as a liquid for the purpose of determining the amount of initial mix to add to the fruit juice concentrate. Thus, for example, when adding the initial mix to a fruit juice concentrate having a concentration ratio of 3:1, three volumes of the initial mix are combined with each corresponding single volume of the fruit juice concentrate. Any of various fruit juices may be employed in concentrated form including, for example, grape, peach, orange, cherry and pineapple juice as well as mixtures of such juices.

The initial mix and the fruit juice concentrate are blended by means of a conventional blender until a uniform mixture is obtained. It is noted at this point that a key factor in the production of the present frozen dessert composition is the ability of the initial mix to accept the concentrated juice and still produce a smooth finished product. The viscosity of the blended final composition is measured using a Brookfield viscometer with Spindle No. 3 at 60 rpm. The viscosity of the final composition, measured at a composition temperature of 50° F., should be in the range of about 700 to 1400 cps.

As stated above, there is thus established: (1) a viscosity range for the initial mix, measured at pasteurization temperature; and (2) a viscosity range for the final blended dessert composition, measured at 50° F., with the fruit juice mixed in.

After blending, the final mixture of fruit juice concentrate and initial mix is frozen in suitable freezer apparatus such as a conventional ice cream freezer and then drawn from the freezer at the normal drawing temperature for ice cream, in the range of approximately 18° to 24° F. The product as it comes from the freezer has been found to exhibit the characteristics of stiffness and pliability which make it suitable for immediate consumption or, alternatively, to be packaged and hardened. When hardened, the present frozen dessert composition maintains excellent eating qualities for periods of up to several months.

The following examples are illustrative of the invention:

EXAMPLE I

An initial mix was prepared having the following composition:

| Component | Amount, Weight % |
|---|---|
| Non Fat Milk Solids | 12 |
| Sweetening Agent (Cane Sugar) | 13 |
| Casein | 0 |
| Other Solid Components | 2 |
| Water | 73 |
| | 100 |

The components of the initial mix was blended together in no particular order in a steam jacket kettle. While under agitation, the mixture was heated to a temperature of 165° F. and pasteurized for thirty minutes. Upon completion of pasteurization, the viscosity of the mix as measured at a mix temperature of 165° F. was determined to be 25 seconds, using the Zahn cup viscosity meter with B tip. The initial mix was then cooled to slightly below 40° F. and stored at such temperature. A test of the solids content of the mix showed a 27.016% total solids. A 3:1 orange juice concentrate, tempered to approximately 40° F., was then blended with the initial mix in a volume ratio of 3 parts mix and 1 part concentrated orange juice. No protein precipitation was observed. The viscosity of the final blended composition was determined to be in the desired range. The amount of 4.73 liters of the final mixture was placed into a Taylor batch freezer and subjected to low temperatures sufficient to freeze the mixture.

Upon drawing samples of the final mixture from the freezer, the following readings were observed:

| Draw | Time | Grams | Temperature | Gloss[1] | Overrun |
|---|---|---|---|---|---|
| | 3:15 | | 36.5° F. | | |
| 1 | 3:27 | 256 | 24.0° F. | 6.9 | 103% |
| 2 | 3:30 | 251 | 22.4° F. | 9.7 | 107% |
| 3 | 3:33 | 260 | 21.9° F. | 9.9 | 100% |
| 4 | 3:35 | 266 | 21.3° F. | 8.8 | 95.5% |
| 5 | 3:37 | 270 | 22.1° F. | 10.6 | 93% |

NOTE:
[1] Gloss meter used was a Glossgard System 60. The gloss meter measured the relative dryness and stiffness of the product.

The frozen dessert composition was hardened in a commercial low temperature box set at 40° F. below zero.

EXAMPLE II

An initial mix was prepared having the following composition:

| Component | Amount, Weight % |
|---|---|
| Non Fat Milk Solids | 12.0 |
| Sweetening Agent (Cane Sugar) | 13.125 |
| Casein | 0.0 |
| Corn Syrup Solids | .755 |
| Microcrystalline Cellulose | .484 |
| Mono and Diglycerides | .208 |
| Guar Gum | .252 |
| Sodium Carboxymethylcellulose | .04 |
| Combination of Calcium Oxide, Magnesium Oxide, Calcium Hydroxide and Magnesium Hydroxide | .108 |
| Carrageenan | .028 |
| Water | 73.0 |
| | 100% |

The initial mix was blended and pasteurized as in Example I. This mix was then blended with orange juice in a similar manner as in Example I, followed by freezing of the final mixture, to provide a frozen dessert in accordance with the present invention.

EXAMPLE III

An initial mix having the following composition was prepared:

| Component | Amount, Weight % |
|---|---|
| Non Fat Milk Solids | 10.0 |
| Sweetening Agent (Polydextrose) | 13.0 |
| Casein | .56 |
| Corn Syrup Solids | .75 |
| Microcrystalline Cellulose | .75 |
| Mono and Diglycerides | .20 |
| Guar Gum | .23 |
| Sodium Carboxymethylcellulose | .05 |
| Combination of Calcium Oxide, Magnesium Oxide, Calcium Hydroxide and Magnesium Hydroxide | .09 |
| Carrageenan | .02 |
| Carob Bean Gum | .05 |
| Water | 74.3 |
| | 100% |

The initial mix was blended and pasteurized as in Example I. The viscosity reading was 31 seconds immediately after pasteurization was completed. Upon cooling of the initial mix to below 40° F., there was added 0.075 weight % of Aspartame, trade name for a low calorie sweetener made by G. D. Searle and Co.

The amount of 120 fl. oz. of initial mix was blended with 16 fl. oz. of 3:1 concentrated orange juice and 24 fl. oz. of 3:1 concentrated pineapple juice in accordance with the general procedures of Example I. This final mixture was thoroughly blended and placed in a suitable freezer.

Upon drawing samples of the final mixture from the freezer, the following readings were observed:

| Draw | Grams | Temperature | Gloss | Overrun |
|---|---|---|---|---|
| 1 | 539 | 45 | | 0 |
| 2 | 279 | 21.8 | 10.9 | 93% |
| 3 | 290 | 21.7 | 8.4 | 86% |
| 4 | 289 | 21.8 | 9.4 | 87% |

| Draw | Grams | Temperature | Gloss | Overrun |
|------|-------|-------------|-------|---------|
| 5 | 270 | 22 | 11.7 | 99.6% |

The characteristics of the frozen product showed that polydextrose could replace sugars in the mix without harming the product or changing the characteristics thereof.

By the present invention there is provided a frozen dessert having a high nutritional profile and with excellent qualities of texture and taste. The nutritional profile of the final product includes: essentially no fat; the equivalent level of protein by weight as in an equivalent amount of whole milk; and the equivalent level of fruit juice solids by weight as in an equivalent amount of fruit juice.

Important features of the present invention include: the addition of concentrated fruit juice to the initial mix after pasteurization of the mix, rather than pasteurizing the two components together, thus avoiding a cooked juice taste; the blending of the initial mix and fruit juice concentrate in cold condition with the mix viscous so that high levels of fruit juice will blend with high levels of protein, without noticeable protein precipitation which would cause graininess; maintaining the viscosity of the mix at a level which will provide a smooth texture; maintaining a high level of protein in the final product; providing a final product having the ability to contain air at 50% of volume; and the ambience of the eating qualities of the final product.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method for the preparation of a frozen dessert which comprises:
   (a) preparing an initial mix containing the following components:

| Component | Amount in Weight % |
|-----------|-------------------|
| Non Fat Milk Solids | 10 to 13.5 |
| Sweetening Agent | 10.5 to 13 |
| Casein | 0 to 1.10 |
| Other solid components selected from the group consisting of stabilizers, emulsifiers, corn syrup solids, calcium salts, magnesium salts and microcrystalline cellulose | 1.5 to 2.25 |
| Water | to 100% |

(b) pasteurizing the initial mix at a minimum temperature of 165° F. for a minimum time period of 30 minutes to obtain an initial mix having a viscosity at a temperature of 165° F. immediately after pasteurization in the range of about 18 to 31 seconds as measured by a Zahn cup viscosity meter with B tip;
   (c) cooling the pasteurized initial mix to a temperature of not greater than 40° F.;
   (d) blending the pasteurized initial mix with fruit juice concentrate to obtain a final blended composition having a viscosity at a composition temperature of 50° F. in the range of about 700 to 1400 cps as measured by a Brookfield viscometer with spindle No. 3 at 60 rpm; and
   (e) freezing the final blended composition to obtain a frozen dessert.

2. The method of claim 1 wherein the fruit juice concentrate is concentrated in the range of from about 3:1 to about 7:1.

3. The method of claim 2 wherein the fruit juice concentrate is tempered prior to use by warming to a temperature of approximately 40° F.

4. The method of claim 1 wherein the initial mix is added to the fruit juice concentrate in an amount sufficient to bring the aqueous phase of the final blended composition to a whole juice strength.

5. The method of claim 1 wherein the sweetening agent is a nutritive carbohydrate sweetening agent.

6. The method of claim 1 wherein the sweetening agent is a low calorie bulking agent having only one-fourth the calories of a sweetener such as cane sugar.

7. The method of claim 1 wherein the other solid components include a stabilizer which is employed in an amount sufficient to produce, in combination with the other initial mix components, the desired viscosity of the initial mix at a temperature of 165° F. immediately after pasteurization in the range of about 18 to 31 seconds as measured by a Zahn cup viscosity meter with B tip.

8. The method of claim 1 wherein the other solid components include an emulsifier which is employed in an amount sufficient to produce, in combination with the other components, a final product having an overrun capability in the range of about 90 to 100%.

9. The method of claim 1 wherein said fruit juice concentrate includes a mixture of concentrates of different fruit juices.

10. A frozen dessert composition obtained by the method of claim 1.

11. A frozen dessert composition which comprises: an amount of protein by weight as in an equivalent amount of whole milk; and an amount of fruit juice by weight as in a corresponding volume of whole juice.

12. The composition of claim 11 wherein said protein is provided by a component selected from the group consisting of non fat milk solids and casein.

13. The composition of claim 11 wherein said fruit juice is provided by a fruit juice concentrate which is concentrated in the range of from about 3:1 to about 7:1.

14. The composition of claim 11 wherein there is included in said composition a sweetening agent.

15. The composition of claim 11 wherein said sweetening agent is a nutritive carbohydrate sweetening agent.

16. The composition of claim 11 wherein said sweetening agent is a low calorie bulking agent having one-fourth the calories of a corresponding amount of cane sugar.

17. The composition of claim 11 wherein said fruit juice includes a mixture of different fruit juices.

* * * * *